United States Patent
Lewis et al.

(10) Patent No.: US 10,157,428 B2
(45) Date of Patent: Dec. 18, 2018

(54) OFFLINE CONTENT SHARING

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

(*) Notice: Subject to any disclaimer, the term of this patent is extended or adjusted under 35 U.S.C. 154(b) by 506 days.

(21) Appl. No.: 14/149,269

(22) Filed: Jan. 7, 2014

(65) Prior Publication Data
US 2015/0195313 A1    Jul. 9, 2015

(51) Int. Cl.
| | | |
|---|---|---|
| *G06F 15/16* | (2006.01) | |
| *G06Q 50/00* | (2012.01) | |
| *H04L 29/08* | (2006.01) | |
| *G06Q 10/10* | (2012.01) | |
| *H04W 4/21* | (2018.01) | |

(52) U.S. Cl.
CPC ............ *G06Q 50/01* (2013.01); *G06Q 10/101* (2013.01); *H04L 67/02* (2013.01); *H04L 67/1095* (2013.01); *H04L 67/32* (2013.01); *H04W 4/21* (2018.02); *H04L 67/22* (2013.01); *H04L 67/2861* (2013.01)

(58) Field of Classification Search
CPC ......... G06Q 50/01; H04L 67/02; H04L 67/32; H04L 67/22; H04W 4/206
USPC ........................................................ 709/204
See application file for complete search history.

(56) References Cited

U.S. PATENT DOCUMENTS

| | | | | |
|---|---|---|---|---|
| 6,130,917 A | * | 10/2000 | Monroe | .................. H04L 29/06 370/466 |
| 6,757,706 B1 | | 6/2004 | Dong et al. | |
| 8,862,762 B1 | * | 10/2014 | Motrenko | ............... H04L 51/10 709/230 |
| 9,594,751 B1 | * | 3/2017 | Gill | .......................... G06F 17/30 |
| 2005/0246752 A1 | * | 11/2005 | Liwerant | ............... G06Q 30/02 725/109 |
| 2010/0153521 A1 | * | 6/2010 | Lor | .......................... G06F 15/16 709/219 |
| 2011/0138003 A1 | | 6/2011 | Yoon et al. | |
| 2011/0191253 A1 | * | 8/2011 | Pilskalns | ............ G06Q 20/3829 705/71 |
| 2012/0072855 A1 | | 3/2012 | Baldwin et al. | |

(Continued)

FOREIGN PATENT DOCUMENTS

KR    10-2011-0065337    6/2011

OTHER PUBLICATIONS

Kaveri Subrahmanyam, Stephanie M. Reich, Natalia Waechter, Guadalupe Espinoza, Online and offline social networks: Use of social networking sites by emerging adults, Journal of Applied Developmental Psychology, vol. 29, Issue 6, 2008, p. 420-433 (Year: 2008).*

(Continued)

*Primary Examiner* — Taylor A Elfervig
(74) *Attorney, Agent, or Firm* — Lowenstein Sandler LLP (57) ABSTRACT

Offline sharing of content is performed. An offline request to share content associated with a content sharing platform to a social networking service is received by a processing device of a user device. The offline request is received while the user device is not connected to a network. A share request is generated for the content in view of the social networking service. The share request for the content is generated while the user device is not connected to the network. Upon determining that a network connection is available, the share request for the content is provided to the social networking service.

17 Claims, 5 Drawing Sheets

(56) References Cited

U.S. PATENT DOCUMENTS

| | | |
|---|---|---|
| 2013/0006733 A1 | 1/2013 | Fisher |
| 2013/0238975 A1* | 9/2013 | Chan ................. G06F 17/30902 |
| | | 715/234 |
| 2013/0246617 A1 | 9/2013 | Zheng |
| 2015/0081630 A1* | 3/2015 | Linsalata ............... G06Q 50/01 |
| | | 707/617 |

OTHER PUBLICATIONS

X. Wang, M. Chen, Z. Han, D. O. Wu and T. T. Kwon, "TOSS: Traffic offloading by social network service-based opportunistic sharing in mobile social networks," IEEE INFOCOM 2014—IEEE Conference on Computer Communications, Toronto, ON, 2014, pp. 2346-2354. (Year: 2014).*

X. Wang, X. Li and V. C. M. Leung, "TASA: traffic offloading by tag-assisted social-aware opportunistic sharing in mobile social networks," The 21st IEEE International Workshop on Local and Metropolitan Area Networks, Beijing, 2015, pp. 1-6. (Year: 2015).*

International Searching Authority, "Notification of Transmittal of the International Search Report and the Written Opinion of the International Search Authority, or the Declaration," for International Application No. PCT/US2015/10499, dated Apr. 29, 2015, 14 pages.

Extended European Search Report for EP Patent Application No. 15734953.1, dated Aug. 2, 2017, 9 pages.

Notice of Preliminary Rejection for KR Patent Application No. 10-2016-7021333, dated Jan. 24, 2017, 7 pages.

* cited by examiner

OFFLINE CONTENT SHARING

TECHNICAL FIELD

Embodiments of the present disclosure relate to the field of content watching services and, more particularly, to a method for offline sharing of content.

BACKGROUND

On the Internet, social networking services allow users to connect to and share information with each other. Many social networking services include a content sharing aspect that allows users to upload, view, and share content, such as video content, image content, audio content, and so on. Other users of the social networking service may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, users are spending increased amounts of time on content sharing platforms. "Sharing" of content items between users of the content sharing platform and with users of other social networking services is important for driving views of content items of the content sharing platform, starting viewing sessions on the content sharing platform, and increasing watch time of content items on the content sharing platform. Sharing refers to a user of the content sharing platform promoting and/or endorsing a content item to another user of the content sharing platform or of another social networking service for viewing purposes.

Currently, when a device used by a user to share content is not connected to a network, the user cannot share a content item. By having to wait until a connection to the network is available, a user may forget or be discouraged from sharing the content item.

SUMMARY

In one embodiment, a method for offline content sharing is performed. An offline request to share content associated with a content sharing platform to a social networking service is received by a processing device of a user device. The offline request is received while the user device is not connected to a network. A share request is generated for the content in view of the social networking service. The share request for the content is generated while the user device is not connected to the network. Upon determining that a network connection is available, the share request for the content is provided to the social networking service.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

Social networking services allow users to share media items or data content with other users and further allow users to create social shares, such as comments or posts, to associate with the media items or data content. A social share refers to content (e.g., comments or posts) resulting from a user sharing content, such as a content item or a media item (e.g., via a like request, a share request, a comment request, a tag request, etc.) on a social networking service or a content sharing service. The social shares can include references to media items or data content. For example, a user viewing video A in a graphical user interface (GUI) can share video A with friends by clicking a share button. A user can view content offline, while the device that the user is using to view the content is not connected to a network, such as a wireless or data network. However, while offline, the user cannot share the content. For example, user A is driving through a part of the country with no network connection. User A can listen to music videos hosted by a content sharing service on his mobile device while offline. While listening to music video B, the song reminds him of a childhood memory. He wants to share music video B with his friends and pulls over to do so. However, because his mobile device is offline (no network connection in the part of the country), user A cannot share music video B. This can be frustrating to user A because he already pulled over and stopped what he was doing in order to share the video, but he cannot do this. Moreover, user A may forget to share the video or choose not to share the video when his mobile device is back online (has a network connection), which can be a loss of new user sessions and a loss of additional sharing for the content sharing service or the social networking service. In addition, the content sharing service is not able to provide the same experience to the user while online and offline.

Embodiments of the present disclosure pertain to offline content sharing. The user is able to share content while the mobile device being used to perform the sharing does not have a network connection. The mobile device (using either a mobile application of the content sharing service, a mobile application of the social networking service, a browser application, etc.) can receive an offline request to share content associated with a content sharing platform to a social networking service. From the perspective of the user submitting the offline request, the sharing process is complete once the user has submitted sharing of the content while offline. In response to the offline request, a share request is generated for the content in view of the social networking service. The share request for the content is generated while the mobile device does not have a network connection. Once a network connection is available, the share request for the content is provided to the social networking service, which will cause the content to be shared by the social networking service.

Accordingly, aspects of the present disclosure allow for offline content sharing, and the user can be able to share content while offline. Although the content is not shared by the social networking service until the mobile device has a network connection, from the perspective of the user, offline sharing of the content is performed because the user does not have to take any action once a network connection is available. Therefore, the user can share the content while offline, and not get frustrated or forget to share the content because of a lack of a network connection. Moreover, from the perspective of the user, sharing while online and sharing while offline are performed in a similar manner.

It should be noted that although some aspects of the present disclosure are described with reference to video and/or pages, the present disclosure pertains to various types media content (e.g., video, audio, text, images, executable instructions, etc.) and/or various types of GUI documents (e.g., web pages, mobile app documents, etc.).

Figure 1:
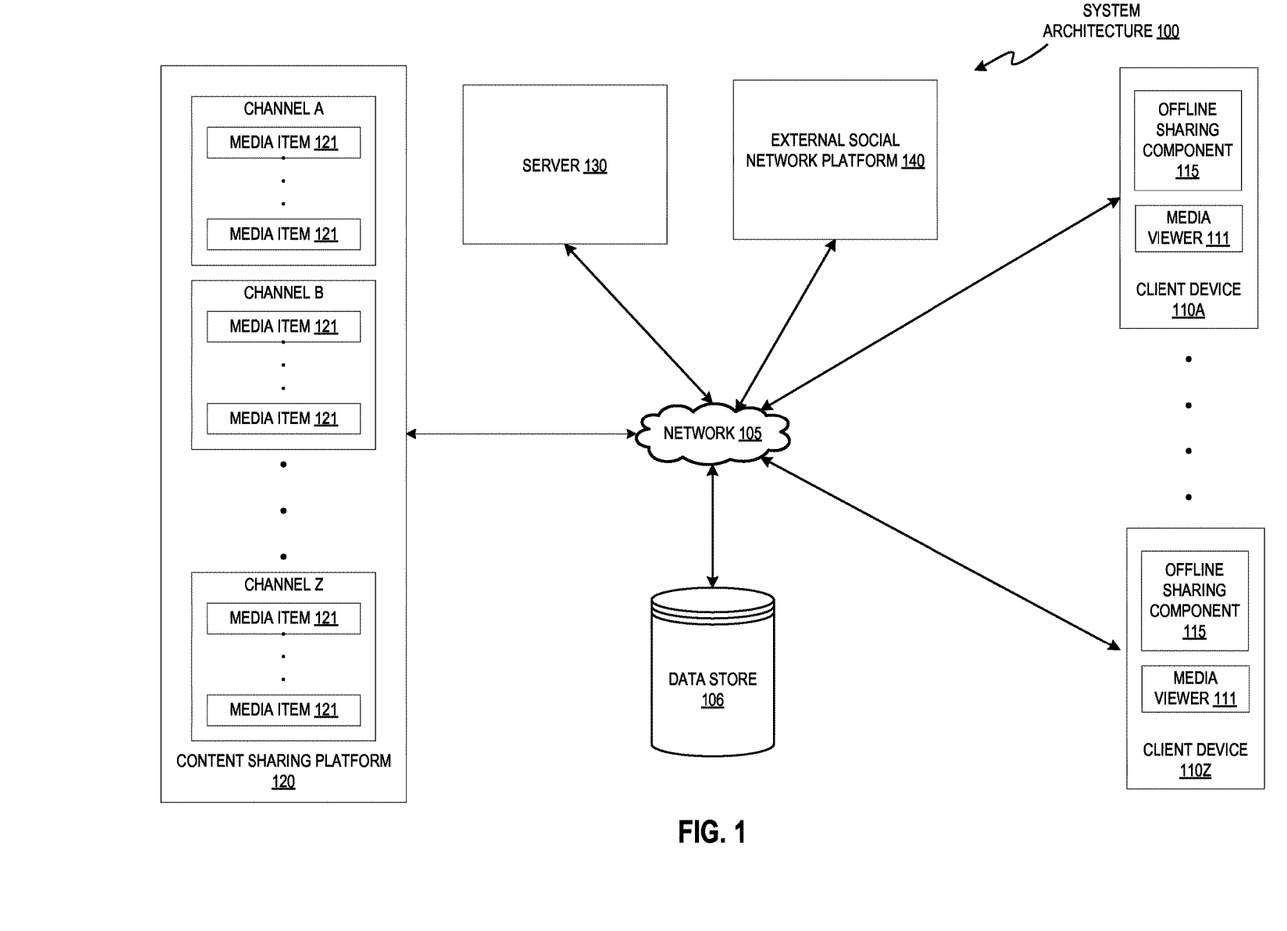
FIG. 1 illustrates an example system architecture, in accordance with one embodiment of the present disclosure.

FIG. 1 illustrates an example system architecture 100, in accordance with one implementation of the disclosure, for offline content sharing. The system architecture 100 includes client devices 110A through 110Z, a network 105, a data store 106, a content sharing platform 120, a server 130, and one or more external social network platforms 140. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item or content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, external social network platform 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to allow a user to share or comment on media items. For example, the external social network platform 140 may allow a user to search for, approve of ("like"), dislike, and/or comment on media items. The external social network platform 140 may also include a website (e.g., a webpage) that may be used by a user to share or comment on the media items.

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111 and an offline sharing component 115. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130, content sharing platform 120, and/or external social network platform 140. For example, the media viewers 111 may be embedded media players that are embedded in web pages provided by the content sharing platform 120. In another example, the media viewers 111 may be applications that are downloaded from the server 130. In yet another example, the media viewers 111 may be applications that are downloaded from the external social network platform 140.

The offline sharing component 115 can perform offline sharing of content associated with the content sharing platform 120. The offline sharing component 115 can be provided to the client devices 110A through 110Z by the server 130, content sharing platform 120, or external social network platform 140. For example, the offline sharing component 115 may be an application downloaded from the content sharing platform 120. In another example, the offline sharing component 115 may be an application downloaded from the external social network platform 140. In yet another example, the offline sharing component 115 may be an application downloaded from the server 130.

In one implementation, the offline sharing component 115 performs offline content sharing for a user of a social networking service, such as the content sharing platform 120 or the external social network platform 140, while the corresponding client device does not have a connection to the network 105 (is offline). The content shared by the offline sharing component 115 may be associated with the content sharing platform 120. The offline content sharing component 115 can obtain an offline request to share content to the social networking service and can generate a share request based on the social networking service while the corresponding client device does not have a connection to the network 105. The offline sharing component 115 can provide the share request to the social networking service (such as content sharing platform 120 or external social network platform 140) once a connection to the network 105 is established. Further description of the offline sharing component 115 and its specific functions is described in more detail below with respect to FIG. 2.

Although implementations of the disclosure are discussed in terms of content sharing platforms and offline content sharing to a social networking service, implementations may also be generally applied to any type of network providing connections between users. Implementations of the disclosure are not limited to content sharing platforms or social networking services.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
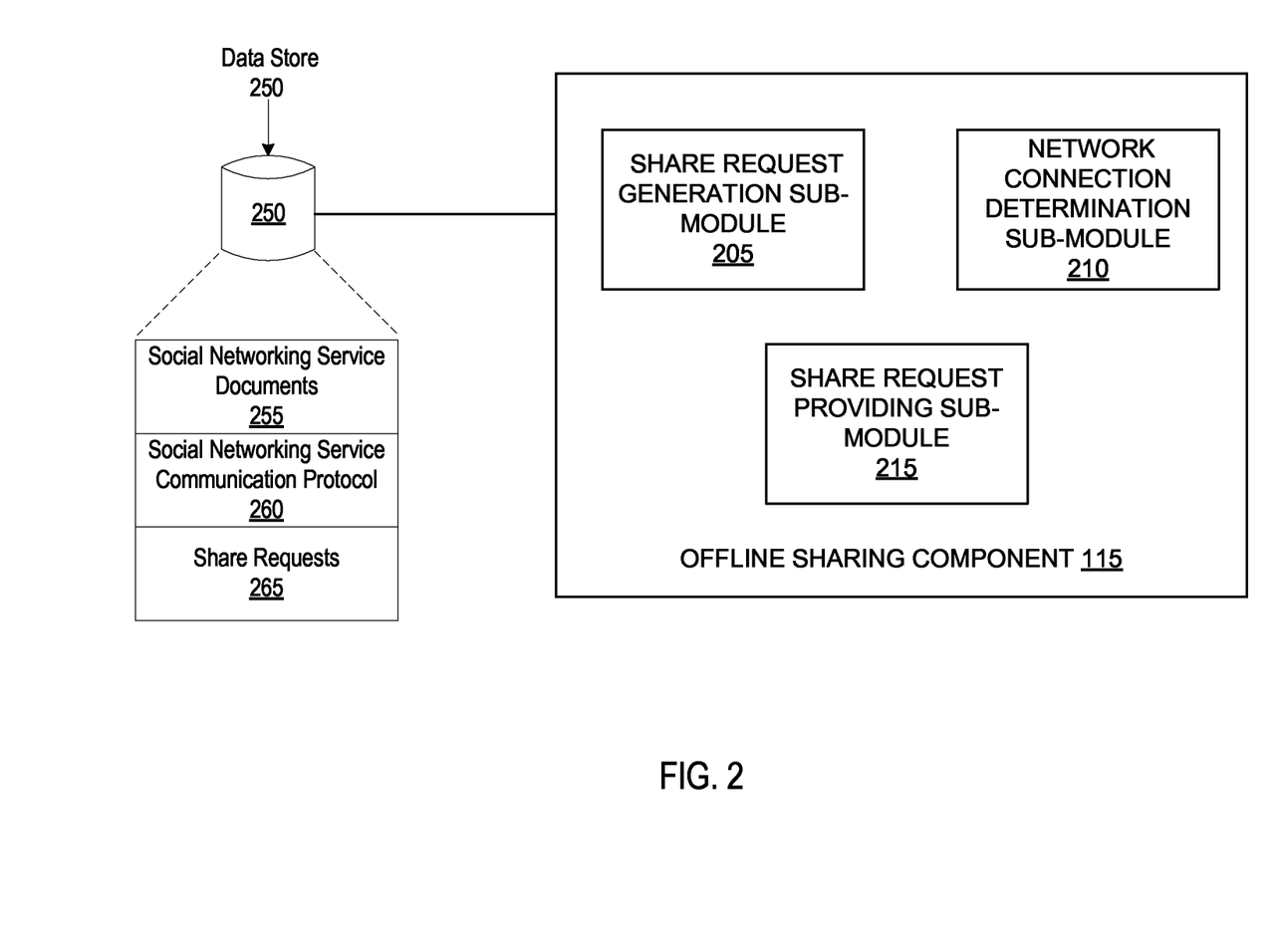
FIG. 2 illustrates a selection module, in accordance with one embodiment of the present disclosure.

FIG. 2 is a block diagram illustrating an offline sharing component 115 in accordance with one implementation of the disclosure. In one implementation, the offline sharing component 115 includes a statistic selection module 210 and a response delivery module 220. More or less components may be included in the information selection component 140 without loss of generality. For example, two of the modules may be combined into a single module, or one of the modules may be divided into two or more modules. In one implementation, one or more of the modules may reside on different computing devices (e.g., different server computers).

The offline sharing component 115 is communicatively coupled to the data store 250. For example, the offline sharing component 115 may be directly coupled to a computing device (e.g., client device 110A) where the offline sharing component 115. In another example, the offline sharing component 115 may be coupled directly to a server where the offline sharing component 115 resides (e.g., may be directly coupled to server 130). The data store 250 may be a memory (e.g., random access memory), a cache, a drive (e.g., a hard drive), a flash drive, a database system, or another type of component or device capable of storing data. The data store 250 may also include multiple storage components (e.g., multiple drives or multiple databases) that may also span multiple computing devices (e.g., multiple server computers). The data store 250 includes social networking service protocol message formats 255 and share requests 260.

As discussed above, the offline sharing component 115 performs offline content sharing. Performing offline content sharing may include receiving an offline request to share a content item associated with a content hosting platform to a social networking service, generating a share request for the content item in view of the social networking service, optionally modifying the share request, and providing the share request to the social networking service once a network connection is established.

In one embodiment, in response to receiving an offline request to share content associated with a content hosting platform to a social network platform, the share request generation sub-module 205 generates a share request based on the social networking service.

In one embodiment, when the share request generation sub-module 205 receives the offline request to share the content via a user interface element, the share request generation sub-module 205 generates the share request by obtaining a previously stored version of a sharing user interface document (e.g., a sharing web page) associated with the social networking service, modifying the sharing user interface document to include content information associated with the content to be shared, and causing the modified sharing user interface document to be provided to the user. For example, the share request generation sub-module 205 can obtain the previously stored version of a sharing user interface document associated with the social networking service from a data store, such as social networking service documents 255 in data store 250.

The share request generation sub-module 205 can modify the previously stored version of the sharing user interface document associated with the social networking service by replacing or modifying portions of the sharing user interface document to include information for the offline sharing of the content, such as a title of the content, a graphic representation (e.g., thumbnail) of the content, a description of the content being shared, etc.

In response to causing the modified sharing user interface document to be provided to the user, the share request generation sub-module 205 can receive another offline share request from the user when the user indicates that the user would like to share the content, such as by selecting a sharing user interface element (e.g., a share button) on the modified sharing user interface document.

The share request generation sub-module 205 generates a share request for the content item in view of the social networking service without a connection to a network (e.g., without a connection to network 105 of FIG. 1). In one embodiment, the share request generation sub-module 205 generates the share request by creating the share request in a predefined format for the social networking service, such as a social networking service communication protocol format. The predefined format can be based on a communication protocol used by the content hosting platform associated with the content item and the social networking service. The share request generation sub-module 205 can obtain the predefined format or a protocol message template from storage, such as social networking service protocol 260 in data store 250. In one embodiment, the share request generation sub-module 205 can create the share request to include a set of parameters, such as information about the content item, information about the user, etc. In one embodiment, the share request generation sub-module 205 can store the share request in storage, such as share requests 265 in data store 250. In an alternate embodiment, the share request generation sub-module 205 provides the share request to an operating system or an application.

The network connection determination sub-module 210 determines whether a network connection is available or established for the device through which the offline request was provided. The network connection determination sub-module 210 can determine whether a network connection is available on a periodic basis, upon receiving an indication from the operating system that there is a network connection available, upon receiving an indication from an application or other source that there is a network connection available, etc. If the network connection determination sub-module 210 determines that a network connection is not available, the network connection determination sub-module 210 continues to wait for a network connection to become available.

The share request providing sub-module 215 provides the share request to the social networking service. In one embodiment, the share request providing sub-module 215 provides the share request to the social networking service by accessing a memory location where the share request is stored, such as share requests 265, and sending the share request to the social networking service (e.g., to a server associated with the social networking service, etc.) using the network connection. In an alternate embodiment, the share request providing sub-module 215 provides the share request to the social networking service by providing an indication to an operating system (not shown) that the operating system can access a memory location where the share request is stored, such as share requests 265, to send the share request to the social networking service. In another alternate embodiment, the share request providing sub-module 215 does not provide the share request to the social networking service, and instead an operating system (not shown) provides the share request to the social networking service. Other alternate embodiments for providing the share request to the social networking service can be used without departing from the scope of the present disclosure. By providing the share request to the social networking service, the share request providing sub-module 215 can cause the social networking service to share the content item referred to by the share request. In some optional embodiments, the share request providing sub-module 215 can provide information to the social networking service in addition to the share request or as part of the share request, such as user information, state information (e.g., browsing activity, items in a virtual shopping cart, etc.), a timestamp corresponding to the date and/or time that the offline request was received, a timestamp corresponding to the date and/or time that the share request was created or provided to the social networking service, etc.

In one optional embodiment, prior to providing the share request, the share request providing sub-module 215 can modify the share request based on user input. The user input can indicate whether the share request should be changed, canceled, etc.

Figure 3A:
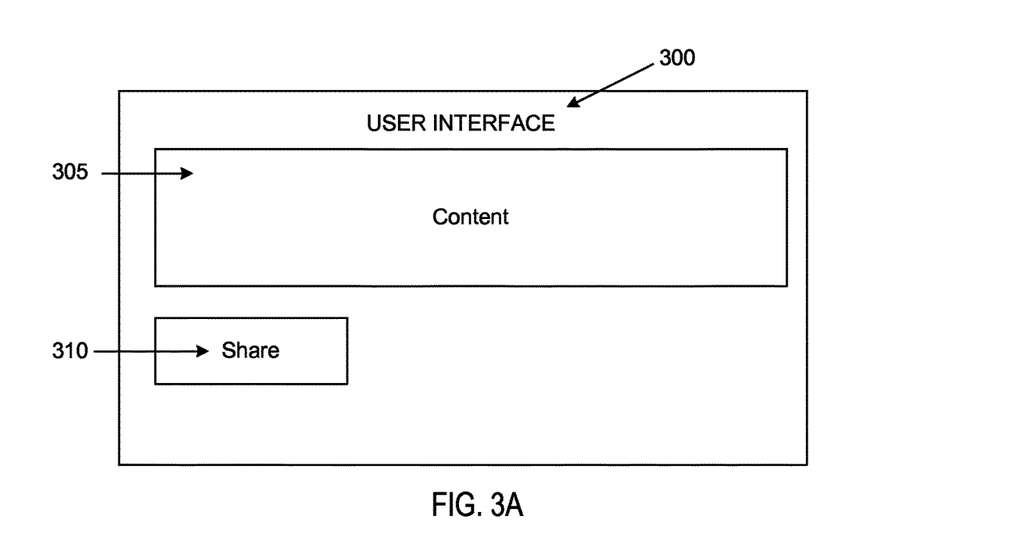
FIG. 3A illustrates a user interface, in accordance with one embodiment of the present disclosure.

FIG. 3A is an example user interface 300 in accordance with one embodiment of the present disclosure. For example, the user can be presented with the user interface 300 when the user requests content. The user interface 300 can be provided to a user via a web browser, an application (e.g., a mobile app), embedded in a third party web page, etc.

The user interface 300 includes content 305 and a share button 310. The content 305 can be a video, an audio file, a blog, etc. The share button 310 can be a user interface element that allows a user to share the content 305 while there is no network connection. In one embodiment, upon selecting the share button 310, the user will not need to take any further action and the content 305 will be shared. In an alternate embodiment, upon selecting the share button 310, an additional user interface is provided to the user. An exemplary additional user interface is described below with reference to FIG. 3B.

Figure 3B:
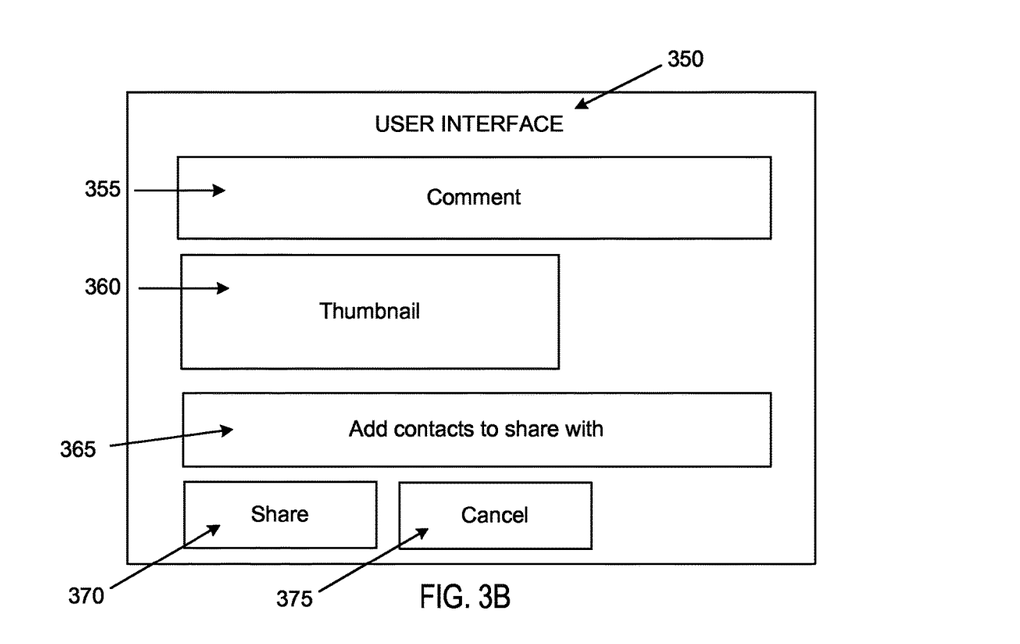
FIG. 3B illustrates a user interface, in accordance with another embodiment of the present disclosure.

FIG. 3B is an example user interface 350 in accordance with one embodiment of the present disclosure. For example, the user can be presented with the user interface 350 when the user submits an offline request to share content. The user interface 350 can be provided to a user via a web browser, an application (e.g., a mobile app), embedded in a third party web page, etc.

The user interface 350 includes comment 355, thumbnail 360, contact user interface element 365, share button 370, and cancel button 375. The comment 355 can be a comment or other textual or visual information to be included in the social share generated by the share request. The thumbnail 360 can be a representation for the content to be shared offline, such as a thumbnail, a title, etc. The user interface element 365 (optional) can allow the user to provide contact information for contacts (names, email addresses, etc.) with whom the user would like to share the content while offline. The share button 370 can be a user interface element, such as a button, that the user can select (e.g., click) to submit the offline request to share the content represented by thumbnail 360. The cancel button 375 can be a user interface element, such as a button, that the user can select (e.g., click) to cancel the offline request to share the content represented by thumbnail 360.

Figure 4:
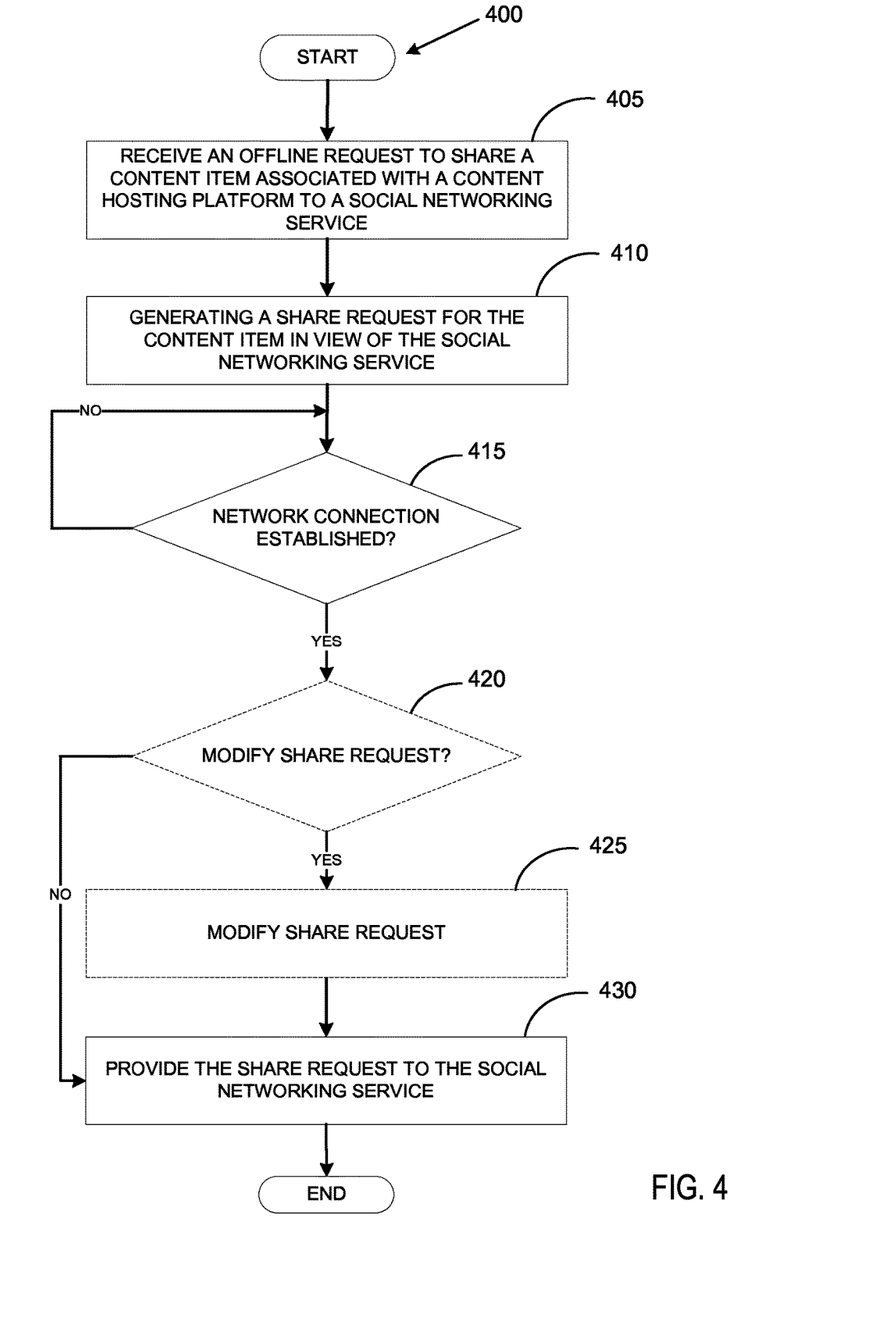
FIG. 4 is a flow diagram illustrating one embodiment for a method of offline content sharing, in accordance with one embodiment of the present disclosure.

FIG. 4 is a flow diagram illustrating an embodiment for a method 400 of offline content sharing. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a client device (e.g., the client devices 110A-110Z of FIG. 1).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by information selection module 120, as shown in FIG. 1.

At block 405, processing logic receives an offline request to share content associated with a content hosting platform to a social network platform. The offline request can be made by a user that would like to share the content using the social networking service while no network connection is available to the processing logic or to the device on which the offline request is made.

In one embodiment, processing logic receives the offline request to share the content via a user interface element (e.g., a share button selected by the user on a webpage) on a social networking service document or a content hosting platform document (e.g., webpage). For example, processing logic receives the offline request to share the content when the user clicks on a share button displayed as part of a social networking service webpage. In this embodiment, in response to receiving the offline request to share the content, processing logic obtains a previously stored version of a sharing user interface document associated with the social networking service, modifies the sharing user interface document to include content information associated with the content to be shared, and causes the modified sharing user interface document to be provided to the user.

The sharing user interface document associated with the social networking service contains both static and dynamic elements. The static elements can be elements that do not change in sharing user interface document, and can include information about the social networking service, user interface elements, such as buttons (including a sharing button to share content), boxes, windows, drop-down lists, etc. The user interface elements in the sharing user interface document can be used by the user to provide comments, identifying information for whom to share the content with (e.g., name, email address, social network groups, etc.), etc. The dynamic elements can include elements that change in the sharing user interface document because they depend on what is being shared or who is sharing it. The dynamic elements of the sharing user interface document can include information about the content being shared, the user sharing the content, etc. Because most of the elements on a sharing user interface document are static, the sharing user interface document can be cached or stored in advance or provided by the social networking service as a template (e.g., HTML template) for its sharing site. Processing logic can obtain the previously stored version of the sharing user interface document from a memory (e.g., cache).

Processing logic can modify the previously stored version of the sharing user interface document associated with the social networking service by replacing or modifying the dynamic elements of the sharing user interface document to include information for the offline sharing of the content. For example, processing logic modifies the dynamic elements of the sharing user interface document to include a title of the content, a graphic representation (e.g., thumbnail) of the content, a description of the content being shared, etc. In one embodiment, in addition to replacing or modifying the dynamic elements of the sharing user interface document, processing logic further modifies the sharing user interface document to include information (e.g., a notification) that the sharing of the content will not occur until a network connection is available or a connection to a network is established. Processing logic can modify the sharing user interface document to include this information by adding an element displaying this information to the sharing user interface document, including the information in an existing dynamic element of the sharing user interface document, creating a pop-up window and including this information in the pop-up window, etc.

In one embodiment, processing logic causes the modified sharing user interface document to be provided to the user by providing the modified sharing user interface document to a browser application and providing a request to the browser application to display the modified sharing user interface document. In an alternate embodiment, processing logic causes the modified sharing user interface document to be provided to the user by providing the modified sharing user interface document to a mobile application associated with the social networking service or the content hosting platform and providing a request to the mobile application to display the modified sharing user interface document. In another alternate embodiment, processing logic causes the modified sharing user interface document to be provided to the user by providing the modified sharing user interface document to an operating system, such as by sending the modified sharing user interface document to the operating system or storing the modified sharing user interface document in a memory accessible by the operating system. In this embodiment, the operating system can display the modified sharing user interface document or otherwise cause the modified sharing user interface document to be displayed.

In response to causing the modified sharing user interface document to be provided to the user, processing logic can receive another offline share request from the user when the user indicates that the user would like to share the content, such as by selecting a sharing user interface element on the modified sharing user interface document. For example, a user is viewing a page including content item A while offline, and clicks on a share button to share content item A using social networking service B. Processing logic will receive the offline request to share content item A from the browser application displaying the page. In response to the offline request to share content item A, processing logic will obtain a previously stored sharing page for social networking service B and modify the previously stored sharing page to include the name of the content item, a thumbnail of the content item, and a description of the content item being shared. Processing logic will then provide the modified sharing page to the browser application and request that the browser application display the modified sharing page. Processing logic then may receive another offline share request from the user when the user selects a sharing button on the modified sharing page to submit the sharing request.

Optionally, in one embodiment, processing logic registers with an operating system associated with the processing logic. By registering with the operating system, processing logic can obtain information, such as the availability of a network connection, from the operating system. Moreover, by registering with the operating system, processing logic can provide information, such as a share request, the offline request, etc., to the operating system. Processing logic can register with the operating system using an interface, such as an application programming interface (API). For example, processing logic uses an method to register with the operating system, such as add_event(event_id, call_back_method). In this example, when an event with the event_id occurs, the operating system will call "call_back_method" and handling of the event will be triggered by the call_back_method. Processing logic can register with the operating system upon installation, upon launch, upon receiving the offline request to share content, etc.

Optionally, in one embodiment, processing logic determines whether the offline request was submitted by a user that was previously authenticated. Processing logic can determine whether the offline request was submitted by a user that was previously authenticated by verifying whether the user logged into the social networking service or the content hosting platform using a mobile application or a browser session. In one embodiment, processing logic can verify whether the user logged into the social networking service or the content hosting platform using the mobile application or browser session by accessing state information (e.g., cookies) stored by the mobile application or browser session. If the state information (e.g., cookies) includes an authentication or identification of the user, processing logic can determine that the offline request was submitted by a user that was previously authenticated. Processing logic can store the state information, authentication information, and the user information to memory. In this optional embodiment, if processing logic determines that the offline request was submitted by a user that was not previously authenticated the method 400 ends. In this optional embodiment, if processing logic determines that the offline request was submitted by a user that was previously authenticated to the social networking service, the method 400 proceeds to block 410.

At block 410, processing logic generates a share request for the content item in view of the social networking service. In one embodiment, processing logic generates a share request for the content item without a network connection being available. In one embodiment, processing logic generates the share request for the content item in view of the social networking service upon receiving a first offline request for the content item. In an alternate embodiment, processing logic generates the share request for the content item in view of the social networking service upon receiving a second offline request for the content item received when the user submits an indication that the user would like to share the content from a modified sharing user interface document customized for the content item.

In one embodiment, processing logic generates the share request by creating the share request in a predefined format and storing the share request until a network connection is available. The predefined format can be based on a communication protocol used by the content hosting platform associated with the content item and the social networking service. For example, the communication protocol can be a remote procedure call (RPC) that causes a subroutine or procedure to be executed by the social networking service. Processing logic can create the share request to include a set of parameters, such as information about the content item, information about the user, etc. In one embodiment, the set of parameters included in the share request are based on the communication protocol. In an alternate embodiment, the set of parameters included in the share request are optional parameters not required by the communication protocol, but are used by the social networking service to share the content item, such as user information associated with the offline request, content information associated with the content item, a timestamp of the date and time that the offline request was received, a timestamp of the date and time that the share request was created, etc.

Different social networking services can use different communication protocols and/or formats for the share request. Processing logic can determine the communication protocol based on the social networking service to which the share request is to be sent and generate the share request based on the communication protocol. For example, if content item is hosted by a content hosting platform A and a user shares the content item to social networking service B. In this example, if content hosting platform A communicates with social networking service B using RPC, processing logic creates a RPC message for the share request including information about the content item and any other information required by the RPC between content hosting platform A and social networking service B.

Once processing logic creates the share request, rather than sending the share request to the social networking service (because there is no network connection to use to send the share request), processing logic can store the share request. In one embodiment, processing logic stores the share request in a memory associated with the processing logic (e.g., a cache, ROM, RAM, etc. available to the processing logic). In an alternate embodiment, processing logic provides the share request to an operating system. In this embodiment, the operating system stores the share request until a network connection is available.

At block 415, processing logic determines whether a network connection is available. In one embodiment, processing logic determines whether a network connection is available by accessing settings (e.g., network settings) of a device and determining whether the settings indicate that the device is connected to a network. In this embodiment, processing logic can determine whether a network connection is available on a periodic basis, such as every second, minute, etc. In an alternate embodiment, processing logic determines that a network is available upon receiving an indication from the operating system that there is a network connection available. In this embodiment, the operating system can provide the indication when the operating system detects a network connection is available. In another alternate embodiment, processing logic determines whether a network connection is available upon receiving an indication from an application or other source that there is a network connection available.

If processing logic determines that there is no network connection available, the method 400 continues to wait for a network connection to be available. If processing logic determines that there is a network connection available, the method 400 proceeds to block 420.

At optional block 420, processing logic determines whether to modify the share request. Processing can determine whether to modify the share request by requesting input from a user to determine if the user wants to modify the share request. In one embodiment, processing logic requests input from the user by causing a user interface to be displayed that asks the user whether to modify the share request. The user interface can include information about the share request, such as the content to be shared, the time and/or date that the offline request was made to share the content, identification information for the user that submitted the offline request, etc. The user interface can further include one or more user interface elements (buttons, selection tool, etc.) to allow the user to modify the share request. The user interface elements can include an element to change the share request or an element to cancel the share request. If processing logic determines not to modify the share request, the method 400 proceeds to block 430. If processing logic determines to modify the share request, the method 400 proceeds to block 425.

At optional block 425, processing logic modifies the share request. Processing logic can modify the share request based on user input. In one embodiment, processing logic obtains the user input from a user interface that captures the user input. In an alternate embodiment, processing logic can obtain the user input from a memory storing the user input. For example, if the user input indicates that the share request should be canceled, processing logic can cancel (e.g., delete, remove) the share request from a memory or cache. In another example, if the user input indicates changes to the share request, such as updating information for the share request (e.g., modify the text that accompanies the share, modify all the content for the share request, modify the metadata for the share request, etc.), processing logic can update the information for the share request based on the user input.

At block 430, processing logic provides the share request to the social networking service. In one embodiment processing logic provides the share request to the social networking service by directly providing the share request to the social networking service. In an alternate embodiment, processing logic provides the share request to the social networking service by providing a message to the social networking service including the share request. In one embodiment, processing logic provides the share request to the social networking service by accessing a memory location where the share request is stored and sending the share request to the social networking service (e.g., to a server associated with the social networking service, etc.) using the network connection. In an alternate embodiment, processing logic provides the share request to the social networking service by providing an indication to the operating system that the operating system should send the share request to the social networking service. In another alternate embodiment, processing logic does not provide the share request to the social networking service, and instead an operating system associated with the processing logic provides the share request to the social networking service. Other alternate embodiments for providing the share request to the social networking service can be used without departing from the scope of the present disclosure. By providing the share request to the social networking service, processing logic can cause the social networking service to share the content item referred to by the share request. To share the content item, the social networking service can reference the content item in a document (e.g., webpage, social share, etc.) associated with the social networking service. For example, the document can be a personal webpage of the user and can include pictures, videos, music, and other media items to share. For example, the social share can be a comment, a post, or any other context that is associated with a social network page.

In some optional embodiments, processing logic provides information to the social networking service in addition to the share request or as part of the share request. In one embodiment, processing logic provides information associated with the user making the share request to the social networking service. The information associated with the user can include login credentials of the user, login information (e.g., name, password, etc.) for the user, authentication information for the user, or any other identification information associated with the user. In one embodiment, processing logic provides information including a snapshot of the current state information. The current state information can include a user's previous browsing activity or other stateful information, such as items in a virtual shopping cart. The user's previous browsing activity can include activities such as clicking particular buttons, logging in, recording the UI documents or webpages visited by the user, etc. In one embodiment, processing logic provides information including a timestamp corresponding to the date and/or time that the offline request was received. In one embodiment, processing logic provides information including a timestamp corresponding to the date and/or time that the share request was created or provided to the social networking service.

Figure 5:
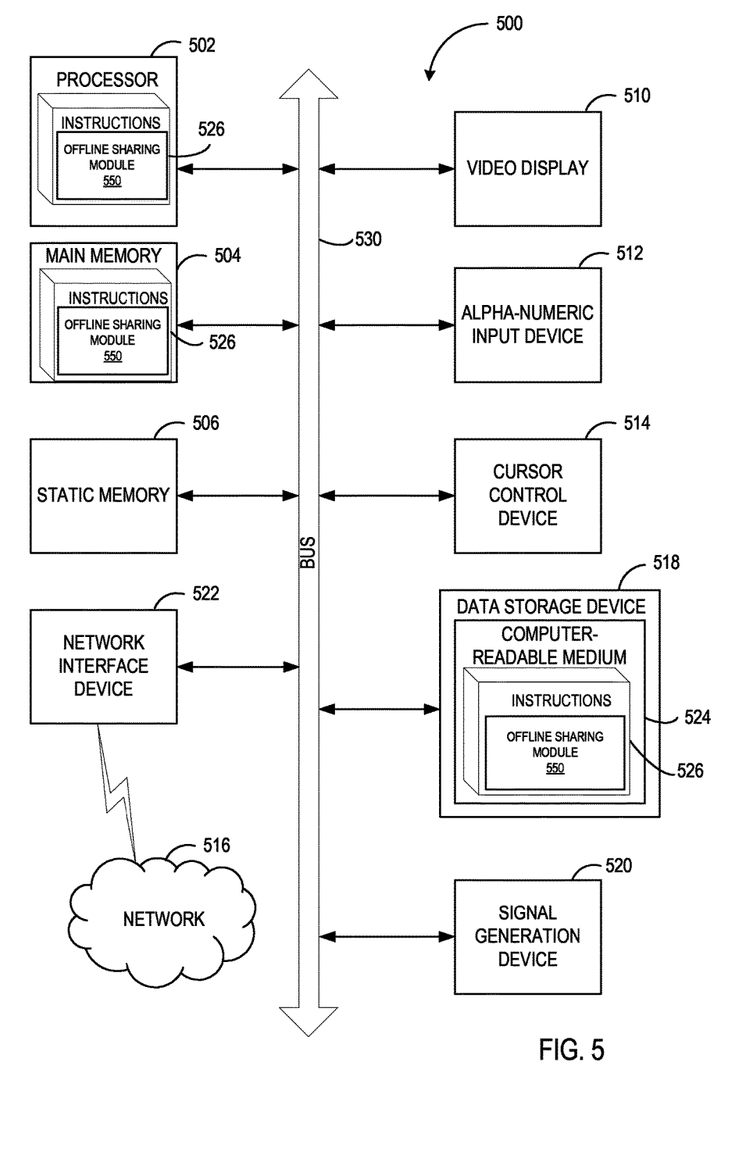
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In one embodiment, the instructions 526 include instructions for an offline sharing module 550, which may correspond to offline sharing component 115 of FIG. 1, and/or a software library containing methods that performs offline content sharing. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying", "presenting," "receiving," "modifying", "subscribing", "providing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for a mobile application of a content sharing platform, the method comprising:

receiving, by the mobile application of the content sharing platform, an offline request pertaining to content provided by the content sharing platform that is separate from social networking platforms, wherein the offline request is received while a user of a user device hosting the mobile application of the content sharing platform is viewing the content provided by the content sharing platform on the user device, and the user device is not connected to a network, and wherein the social networking platforms are each associated with a respective unique sharing user interface (UI) of sharing UIs stored locally on the user device;

obtaining, by the mobile application of the content sharing platform, a sharing UI of the sharing UIs for a social networking platform on which the content is to be shared;

modifying, by the mobile application of the content sharing platform, the sharing UI for the social network platform to comprise content information associated with the content provided by the content sharing platform, wherein the content information comprises at least one of a name of the content, a thumbnail representing the content, or a description of the content;

presenting, by the mobile application of the content sharing platform, the modified sharing UI for the social network platform, and receiving, via the modified sharing UI for the social network platform, an offline request to share the content on the social networking platform;

identifying, by the mobile application of the content sharing platform, a communication protocol for the social networking platform;

selecting, by the mobile application of the content sharing platform, a predefined share request format for the communication protocol for the social networking platform from a plurality of predefined share request formats stored locally on the user device;

generating, by the mobile application of the content sharing platform, a share request to share the content provided by the content sharing platform on the social networking platform, wherein the share request to share the content provided by the content sharing platform is generated in the predefined share request format based on the offline request received via the modified sharing UI for the social network platform, while the user device is not connected to the network; and upon determining a network connection is available, transmitting, by the mobile application of the content sharing platform, the share request to cause the content provided by the content sharing platform to be shared on the social networking platform.

2. The method of claim 1,
wherein generating the share request comprises:
including user information associated with the offline request and the content information associated with the content in the share request.

3. The method of claim 1, further comprising:
registering, by the mobile application, with an operating system of the user device; and
upon receiving the offline request and generating the share request, storing, by the mobile application, the share request to a memory of the user device,
wherein transmitting the share request is performed by the mobile application upon receiving an indication from the operating system that there is a connection to the network.

4. The method of claim 1, wherein the modified sharing UI presented to the user comprises a notification that the share request is not to be transmitted until a connection to the network is established.

5. The method of claim 1, further comprising:
storing the information associated with the user to a memory of the user device;
causing the information associated with the user to be provided to the social networking platform; and
causing a snapshot of current state information to be provided to the social networking platform.

6. The method of claim 1, further comprising:
determining if a user submitting the request to perform the offline sharing was previously authenticated to the social networking platform.

7. The method of claim 1, further comprising:
prior to transmitting the share request, presenting the share request to the user to allow the user to modify the share request, wherein allowing the user to modify the share request comprises allowing the user to cancel the share request or to change the share request.

8. The method of claim 1, further comprising:
providing, with the share request, a timestamp corresponding to a time the offline request was received by the mobile application of the content sharing platform, the timestamp to be presented with the shared content on the social networking platform.

9. A non-transitory computer readable storage medium having instructions that, when executed by a processing device, cause the processing device to perform operations comprising:

receiving, by a mobile application of the content sharing platform, an offline request pertaining to content provided by the content sharing platform that is separate from social networking platforms, wherein the offline request is received while a user of a user device hosting the mobile application of the content sharing platform is viewing the content provided by the content sharing platform on the user device, and the user device is not connected to a network, and wherein the social networking platforms are each associated with a respective unique sharing user interface (UI) of sharing UIs stored locally on the user device;

obtaining, by the mobile application of the content sharing platform, a sharing UI of the sharing UIs for a social networking platform on which the content is to be shared;

modifying, by the mobile application of the content sharing platform, the sharing UI for the social network platform to comprise content information associated with the content provided by the content sharing platform, wherein the content information comprises at least one of a name of the content, a thumbnail representing the content, or a description of the content;

presenting, by the mobile application of the content sharing platform, the modified sharing UI for the social network platform and receiving, via the modified sharing UI for the social network platform, an offline request to share the content on the social networking platform;

identifying, by the mobile application of the content sharing platform, a communication protocol for the social networking platform;

selecting, by the mobile application of the content sharing platform, a predefined share request format for the communication protocol for the social networking platform from a plurality of predefined share request formats stored locally on the user device;

generating, by the mobile application of the content sharing platform, a share request to share the content provided by the content sharing platform on the social networking platform, wherein the share request to share the content provided by the content sharing platform is generated in the predefined share request format based on the offline request received via the modified sharing UI for the social network platform while the user device is not connected to the network; and upon determining a network connection is available, transmitting, by the mobile application of the content sharing platform, the share request to cause the content provided by the content sharing platform to be shared on the social networking platform.

10. The non-transitory computer readable storage medium of claim 9, wherein generating the share request comprises:
including user information associated with the offline request and content information associated with the content in the share request.

11. The non-transitory computer readable storage medium of claim 9, wherein the instructions, when executed by the processing device, cause the processing device to perform further operations comprising:

registering, by the mobile application, with an operating system of the user device; and upon receiving the offline request and generating the share request, storing, by the mobile application, the share request to a memory of the user device, wherein transmitting the share request is performed by the mobile application upon receiving an indication from the operating system that there is a connection to the network.

12. The non-transitory computer readable storage medium of claim 9, wherein the instructions, when executed by the processing device, cause the processing device to perform further operations comprising:

storing the information associated with the user to a memory of the user device;

causing the information associated with the user to be provided to the social networking platform; and causing a snapshot of current state information to be provided to the social networking platform.

13. The non-transitory computer readable storage medium of claim 9, wherein the instructions, when executed by the processing device, cause the processing device to perform further operations comprising:

providing, with the share request, a timestamp corresponding to a time the offline request was received by the mobile application of the content sharing platform, the timestamp to be presented with the shared content on the social networking platform.

14. A computing device comprising:

a memory; and a processing device coupled to the memory, wherein the processing device is to execute a mobile application of a content sharing platform to:

receive an offline request pertaining to content provided by the content sharing platform that is separate from social networking platforms, wherein the offline request is received while a user of a user device hosting the mobile application of the content sharing platform is viewing the content provided by the content sharing platform on the user device, and the user device is not connected to a network, and wherein the social networking platforms are each associated with a respective unique sharing user interface (UI) of sharing UIs stored locally on the user device;

obtain a sharing UI of the sharing UIs for a social networking platform on which the content is to be shared;

modify the sharing UI for the social network platform to comprise content information associated with the content provided by the content sharing platform, wherein the content information comprises at least one of a name of the content, a thumbnail representing the content, or a description of the content;

present the modified sharing UI for the social network platform and receive, via the modified sharing UI for the social network platform, an offline request to share the content on the social networking platform;

identify a communication protocol for the social networking platform;

select a predefined share request format for the communication protocol for the social networking platform from a plurality of predefined share request formats stored locally on the user device;

generate a share request to share the content provided by the content sharing platform on the social networking platform, wherein the share request to share the content provided by the content sharing platform is generated in the predefined share request format based on the offline request received via the modified sharing UI for the social network platform while the user device is not connected to the network; and upon determining a network connection is available, transmit the share request to cause the content provided by the content sharing platform to be shared on the social networking platform.

15. The computing device of claim 14, wherein to generate the share request, the processing device is further to:

include user information associated with the offline request and the content information associated with the content in the share request.

16. The computing device of claim 14, wherein the processing device is further to:

store the information associated with the user to a memory of the user device;

cause the information associated with the user to be provided to the social networking platform; and cause a snapshot of current state information to be provided to the social networking platform.

17. The computing device of claim 14, wherein the processing device is further to:

provide, with the share request, a timestamp corresponding to a time the offline request was received by the mobile application of the content sharing platform, the timestamp to be presented with the shared content on the social networking platform.

* * * * *